(12) United States Patent
Reckels et al.

(10) Patent No.: US 10,794,166 B2
(45) Date of Patent: Oct. 6, 2020

(54) ELECTRIC HYDRAULIC FRACTURING SYSTEM

(71) Applicant: DRESSER-RAND COMPANY, Olean, NY (US)

(72) Inventors: Udo Reckels, Neuss (DE); Harold Jones, Houston, TX (US)

(73) Assignee: DRESSER-RAND COMPANY, Olean, NY (US)

( * ) Notice: Subject to any disclaimer, the term of this patent is extended or adjusted under 35 U.S.C. 154(b) by 0 days.

(21) Appl. No.: 16/333,363

(22) PCT Filed: Oct. 13, 2017

(86) PCT No.: PCT/US2017/056449
§ 371 (c)(1),
(2) Date: Mar. 14, 2019

(87) PCT Pub. No.: WO2018/071738
PCT Pub. Date: Apr. 19, 2018

(65) Prior Publication Data
US 2019/0211661 A1    Jul. 11, 2019

Related U.S. Application Data

(60) Provisional application No. 62/408,478, filed on Oct. 14, 2016.

(51) Int. Cl.
*E21B 43/267* (2006.01)
*E21B 43/26* (2006.01)
(Continued)

(52) U.S. Cl.
CPC ............ *E21B 43/267* (2013.01); *E21B 43/26* (2013.01); *F01D 15/08* (2013.01); *F02C 6/00* (2013.01); *F04B 17/03* (2013.01); *F04B 47/02* (2013.01)

(58) Field of Classification Search
None
See application file for complete search history.

(56) References Cited

U.S. PATENT DOCUMENTS

| | | | |
|---|---|---|---|
| 9,410,410 B2 * | 8/2016 | Broussard | E21B 43/26 |
| 2007/0277982 A1 * | 12/2007 | Shampine | E21B 43/267 |
| | | | 166/308.1 |

(Continued)

FOREIGN PATENT DOCUMENTS

WO    2014078236 A1    5/2014

OTHER PUBLICATIONS

PCT International Search Report and Written Opinion dated Jan. 30, 2018 corresponding to PCT Application No. PCT/US2017/056449 filed Oct. 13, 2017.

*Primary Examiner* — Matthew R Buck
*Assistant Examiner* — Douglas S Wood

(57) ABSTRACT

A hydraulic fracturing system that includes a fixed-speed gas turbine assembly having a gas generator and power turbine, both mounted to a semi-trailer. The system further includes a hydraulic pump mounted to the semi-trailer and connected to an output shaft of the power turbine and a hydraulically-driven fracturing fluid pump mounted to the semi-trailer and being in fluid communication with the hydraulic pump, the hydraulic pump supplying fluid pressure to the hydraulically-driven fracturing fluid pump. The system is configured such that the hydraulically-driven fracturing fluid pump receives fracturing fluid containing chemicals and proppants and pressurizes the fracturing fluid to a pressure sufficient for injection into a wellbore to support a hydraulic fracturing operation.

7 Claims, 3 Drawing Sheets

(51) Int. Cl.
*F01D 15/08* (2006.01)
*F02C 6/00* (2006.01)
*F04B 17/03* (2006.01)
*F04B 47/02* (2006.01)

(56) References Cited

U.S. PATENT DOCUMENTS

| | | |
|---|---|---|
| 2009/0068031 A1 | 3/2009 | Gambier et al. |
| 2014/0138079 A1 | 5/2014 | Broussard et al. |
| 2014/0219824 A1* | 8/2014 | Burnette ............... F04B 47/00 417/53 |
| 2016/0290114 A1 | 10/2016 | Oehring et al. |

* cited by examiner

ELECTRIC HYDRAULIC FRACTURING SYSTEM

BACKGROUND

Hydraulic fracturing is a process used to stimulate production from oil and gas wells. Hydraulic fracturing generally involves pumping a high pressure fluid mixture that includes particles/proppants and optional chemicals at high pressure through the wellbore into a formation. As the high-pressure fluid mixture enters the formation, it fractures the formation and creates fissures. When the fluid pressure is released from the wellbore and formation, the fractures or fissures settle, but are at least partially held open by the particles/proppants carried in the fluid mixture. Holding the fractures open allows for the extraction of oil and gas from the formation.

A typical hydraulic fracturing system uses a number of large diesel engine-powered pumps to pressurize the fluid mixture being injected into the wellbore and formation. These large diesel engine-powered pumps are difficult to transport due to their size and weight and are equally if not more difficult to move or position on a wellsite where paved roads and space to maneuver is typically not available. Further, these large diesel engine powered pumps require large fuel tanks which must also be transported to the undeveloped wellsite. Another disadvantage of conventional diesel engine-powered fracturing systems is the maintenance requirement of the diesel engines, which generally require significant maintenance activity every 300-400 hours, thus resulting in regular downtime of the equipment every 2-3 weeks.

In view of the desirability of hydraulic fracturing along with the known disadvantages of diesel engine-powered fracturing pump systems, the oil and gas industry is investigating options that will allow for the substitution of electrically-driven pumps for conventional diesel engine-powered pumps in hydraulic fracturing systems. There are currently a small number of companies developing electrically-driven hydraulic fracturing systems whereby a gas turbine-powered generator is positioned on site and used to generate electrical power for the electric pumping systems. However, current electrically-driven hydraulic fracturing systems also have possible disadvantages. For example, conventional electric configurations require the generator assembly and electrical room components to be on a first trailer while the electric motor, coolers, and pump are on a second trailer, as the size and weight of these components cannot be carried by a single trailer. The electrical interconnection between the generator trailer and the electric pump trailer has also presented several challenges due to the size and weight of the electrical power cables between the generator and electric pump trailers.

Therefore, there is a need for an improved hydraulic fracturing pump system that overcomes the challenges of current systems.

SUMMARY

Embodiments of the disclosure provide an improved hydraulic fracturing system that includes a fixed speed gas turbine assembly having a gas generator and power turbine, both mounted to a semi-trailer. The system further includes a hydraulic pump mounted to the semi-trailer and connected to an output shaft of the power turbine and a hydraulically-driven fracturing fluid pump mounted to the semi-trailer and being in fluid communication with the hydraulic pump, the hydraulic pump supplying fluid pressure to the hydraulically-driven fracturing fluid pump. The system is configured such that the hydraulically-driven fracturing fluid pump receives fracturing fluid containing chemicals and proppants and pressurizes the fracturing fluid to a pressure sufficient for injection into a wellbore to support a hydraulic fracturing operation.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
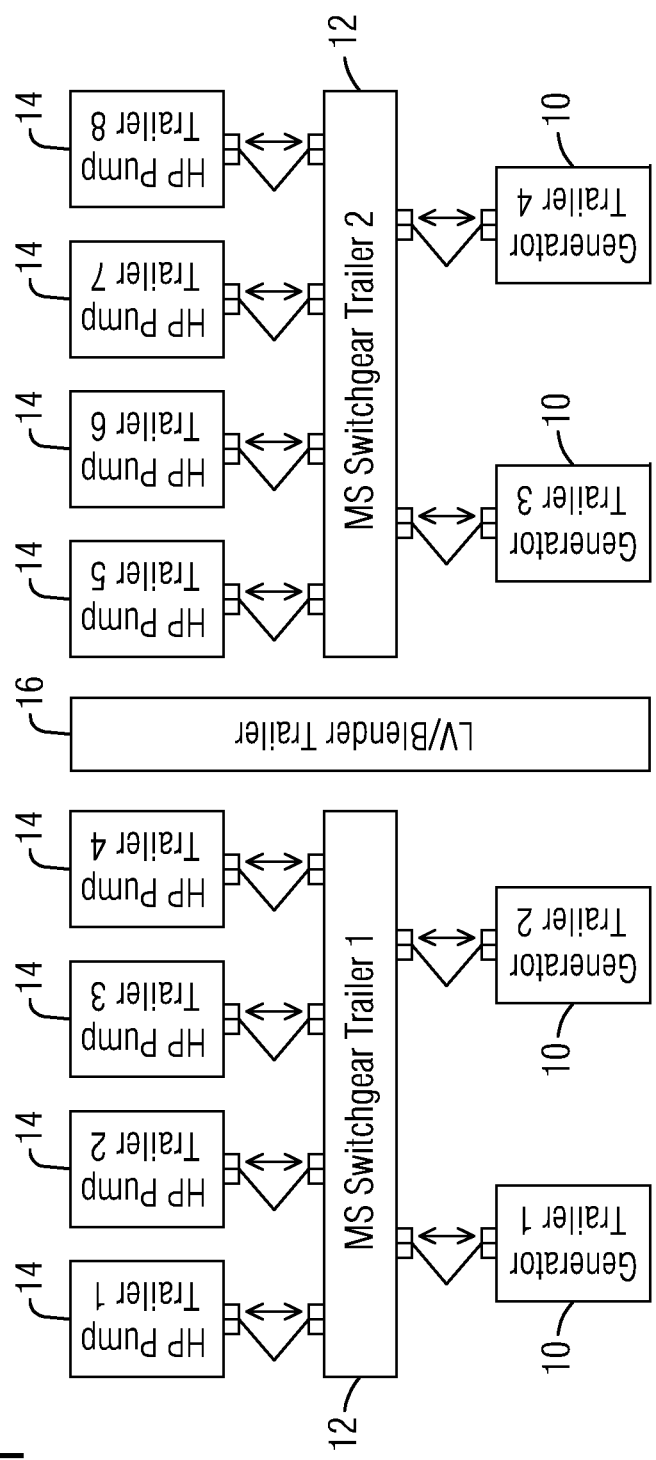
FIG. 1 illustrates an exemplary electric fracturing pump wellsite configuration using electrically driven fluid pumps.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary electric fracturing pump wellsite configuration using electrically driven fluid pumps. The exemplary electric fracturing pump system may include four separate generators, each generator being mounted on its own independent semi-trailer. Each generator generally includes a gas turbine based system, whereby a gas generator rotates a power turbine coupled to a generator either directly or through a gearbox. The generator trailers 10 are shown across the bottom of FIG. 1. Immediately above the generator trailers 10 are the switchgear trailers 12, wherein two generators feed a common switchgear trailer and are electrically connected thereto. Each switchgear semi-trailer 12 is also electrically connected to four high pressure electrically driven fluid pumping trailers 14. As such, in the present exemplary embodiment, each generator is configured to supply electrical power to two of the high pressure electric pump trailers 14. Generally, the gas turbines and the pumps can also be connected to a common bus bar, so that the gas turbines can run at different loads, e.g. one at 100% and the other at 50%. The high pressure pump trailers 14 are connected to high pressure fluid lines that feed into the wellbore (not shown). Before going into the high pressure pump trailers, the fracturing fluid is mixed in a blender 16, which is shown in the middle of FIG. 1.

The embodiment illustrated in FIG. 1 includes a set or quadrant of equipment on the left side of the figure, where in the quadrate of equipment includes two generators 10, a switchgear trailer 12, and four pumps 14. A second quadrant of equipment is shown on the right-hand side of the figure and is essentially a mirror image of the first quadrant of equipment. In other embodiments, two additional quadrants of equipment could be added opposing the two quadrants shown in FIG. 1, i.e., extending upward from the high pressure lines there could be two additional quadrants of generators 10, switchgear 12, and pumps 14. In these four-quadrant systems, higher flow volumes and pressures may be obtained for the hydraulic fracturing operation.

Figure 2:
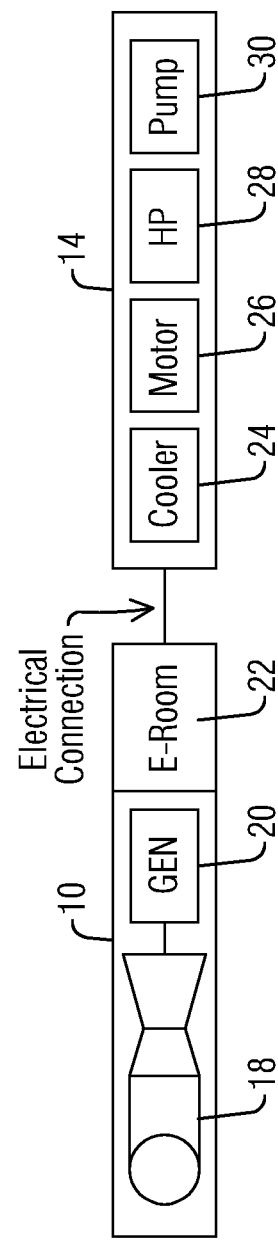
FIG. 2 illustrates an exemplary hydraulic fracturing pump system.

In this configuration, a quadrant of equipment for a wellsite fracturing operation would require a total of seven semi-trailers to support four hydraulic fracturing pumps. These seven semi-trailers include four trailers having electric pumps mounted there on that are electrically connected to a semi-trailer having the electrical switchgear mounted thereon, which is connected to two gas turbine generator trailers for a total of seven semi-trailers used to supply a four pump quadrant. This is a substantial savings over the conventional diesel configurations that would typically require 8 to 12 or more semi-trailers to support a four pump quadrant of equipment FIG. 2 illustrates an exemplary hydraulic fracturing pump system of the present disclosure. The hydraulic fracturing pump system includes two individual trailers, wherein a first trailer 10 includes a power generation system and a second trailer includes a hydraulic pumping system 14. The power generation trailer 10, which is shown on the left side of FIG. 2, includes a gas turbine assembly 18, which includes a gas generator and a power turbine configured to convert the high pressure and high velocity gas into rotational shaft work. The shaft of the power turbine is then connected to a generator 20, either directly or through a gearbox assembly configured to reduce the rotation speed of the power turbine to match the desired rotation speed of the generator 20. The generator 20 is then connected to an electric room 22, which may include transformers, switchgear, variable frequency drives, and other electrical components needed to drive high power electric motors. The second trailer 14, which is shown on the right side of FIG. 2, includes a cooling unit 24, a fixed speed electric motor 26, a hydraulic pump 28 connected to the electric motor, and a high pressure pump connected to the hydraulic pump 30. As such, the second trailer 14 receives electrical power from the power generation trailer 10. The electrical power is provided to the fixed speed electric motor 26, which rotates the hydraulic pump 28. The hydraulic pump 28 generates hydraulic fluid pressure that is used to rotate and control the flowrate of the high pressure fracturing fluid pump 30. The high pressure fracturing fluid pump 30 receives the fracturing liquids and pressurizes them for subsequent injection into the wellbore and formation.

Figure 3:
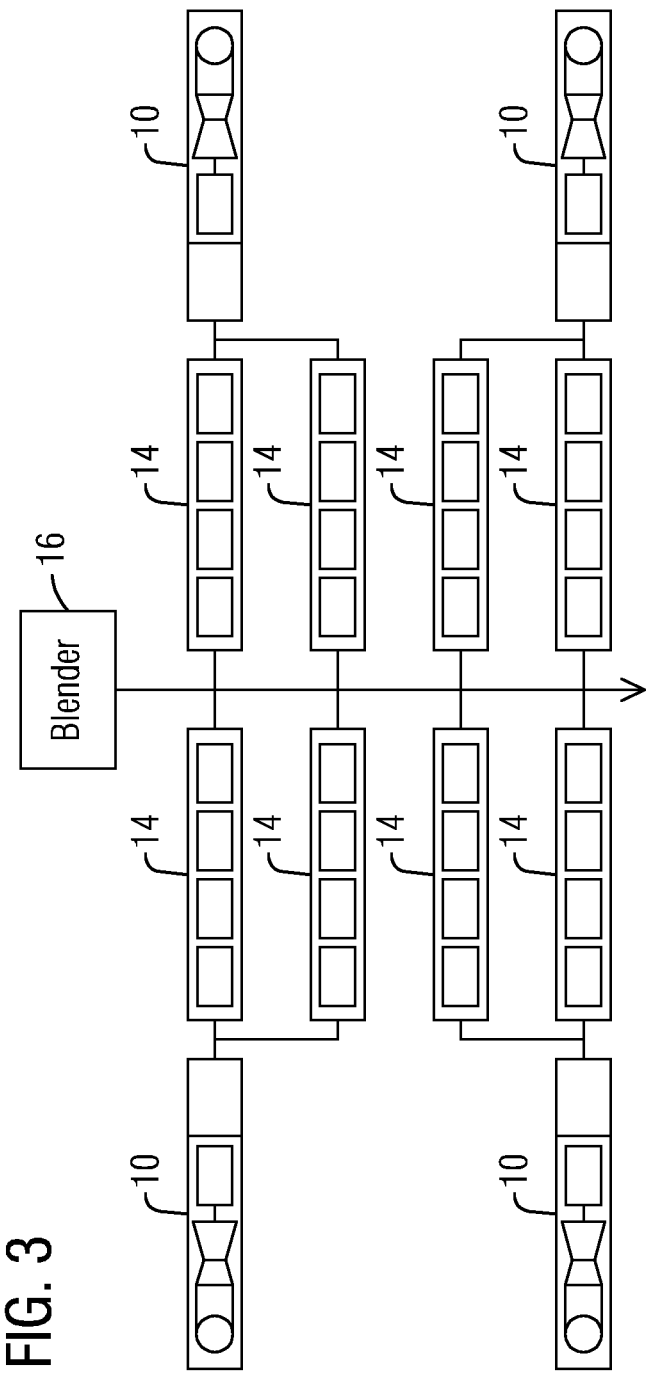
FIG. 3 illustrates an exemplary hydraulic fracturing pump wellsite configuration using the hydraulic fracturing pump of FIG. 2.

FIG. 3 illustrates an exemplary hydraulic fracturing pump wellsite configuration using the hydraulic fracturing pump 30 of FIG. 2. The wellsite configuration illustrated in FIG. 3 shows two quadrants of an exemplary hydraulic fracturing wellsite configuration. The first quadrant of the configuration is shown on the left-hand side of the figure, i.e., to the left of the blender 16, while the second quadrant of the configuration is shown on the right side of the figure, i.e., to the right of the blender 16. Each quadrant generally includes two power generation trailers 10, as shown in FIG. 2. Each power generation trailer 10 may be electrically connected to two of the hydraulic fracturing pump trailers 14. The quadrant of equipment generally includes two power generation trailers 10 and four hydraulic fracturing pump trailers 14. As described in FIG. 2, the gas turbine 18 drives a generator 20 to create electrical power that is communicated to the individual hydraulic pump trailers 14, where an electric motor 26 drives the hydraulic pump 28 that drives the hydraulic fracturing fluid pump 30. In showing the two quadrants, the inventors note that a typical configuration uses a single blender and hydration unit for an entire wellsite (typically 4 quadrants). The configuration shown illustrates a blender 10 positioned in the two quadrants for illustration purposes only, as it is understood that a single blender 10 would typically supply 4 quadrants of pumping equipment.

FIG. 3 illustrates a substantial footprint savings over conventional diesel and electric powered fracturing pump systems, as various trailers are eliminated from the configuration. For example, when comparing the hydraulic fracturing pump system illustrated in FIG. 3 to the electric fracturing pump systems illustrated in FIG. 1, each quadrant of the system in FIG. 3 eliminates an entire semi-trailer of equipment, i.e., the switchgear equipment. In the hydraulic fracturing system illustrated in FIG. 3 the switchgear equipment is either eliminated or incorporated into the electric room 22 that is mounted integrally with the gas turbine generator equipment. In this configuration, a quadrant of equipment for a wellsite fracturing operation would require a total of 6 semi-trailers to support hydraulic fracturing pumps. These six semi-trailers include four trailers 14 having hydraulic pumps mounted there on that are electrically connected to two semi-trailers 10 having gas turbine generators thereon for a total of six trailers to supply a four pump quadrant of equipment, which saves the footprint of an entire semi-trailer over the previously discussed electrically driven pump configuration of FIG. 1.

Figure 4:
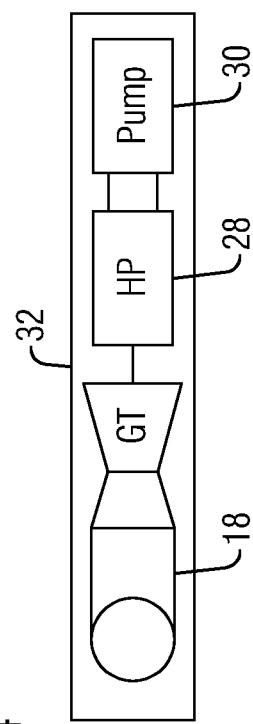
FIG. 4 illustrates another exemplary hydraulic fracturing pump system.

FIG. 4 illustrates another exemplary hydraulic fracturing pump system. The hydraulic fracturing pump system of FIG. 4 further improves upon each of the previously discussed embodiments in that the footprint of the configuration is substantially reduced. The hydraulic fracturing pump system of FIG. 4 is a single trailer unit, wherein a gas turbine assembly including a gas generator and power turbine is mounted on a semi-trailer. The gas turbine assembly may further include an exhaust system to safely direct the hot gas exiting the system and optionally a gearbox connected to the power turbine to reduce the RPM of the output shaft of the power turbine assembly. The power turbine output shaft is coupled to a hydraulic pump, either directly or through an appropriately chosen gearbox. The hydraulic pump, which is mounted on the same trailer as the gas turbine assembly, creates hydraulic pressure that is used to drive a hydraulic fracturing fluid pump that is also mounted on the same trailer. The hydraulic fracturing fluid pump receives and pressurizes the fluids and/or chemicals that are to be injected into the wellbore to conduct the fracturing operation.

In the system shown in FIG. 4, the gas turbine assembly 18 directly drives the hydraulic pump system 28 that is used to hydraulically pressurize and operate the fracturing fluid pump 30, thus eliminating the generator 20 and electric motor components used in the previous embodiment. A gearbox may optionally be positioned between the gas turbine assembly and the hydraulic pump to reduce the shaft rotation speed of the gas turbine, which is typically about 15,000 RPM, down to a desired rotation speed for the hydraulic pump, which may be in the 2-5000 RPM range for a typical configuration. The gas turbine assembly 18 used may be a fixed speed gas turbine assembly that is configured to rotate at a desired and constant RPM. These types of gas turbine assemblies are typically single shaft turbines. In this configuration a fixed speed gas turbine assembly is driving a hydraulically controlled fracturing fluid pump. In this embodiment, each of the gas turbine assembly 18 (gas generator and the power turbine), the gearbox (if used), the hydraulic pump 28 and associated tanks, and the hydraulic fracturing pump 30 to pressurize the fracturing fluid are all positioned/mounted on a single semi-trailer, which is typically a standard road worthy/legal 48 ft or 53 ft semi-trailer with a gross weight of about 50,000 pounds.

Figure 5:
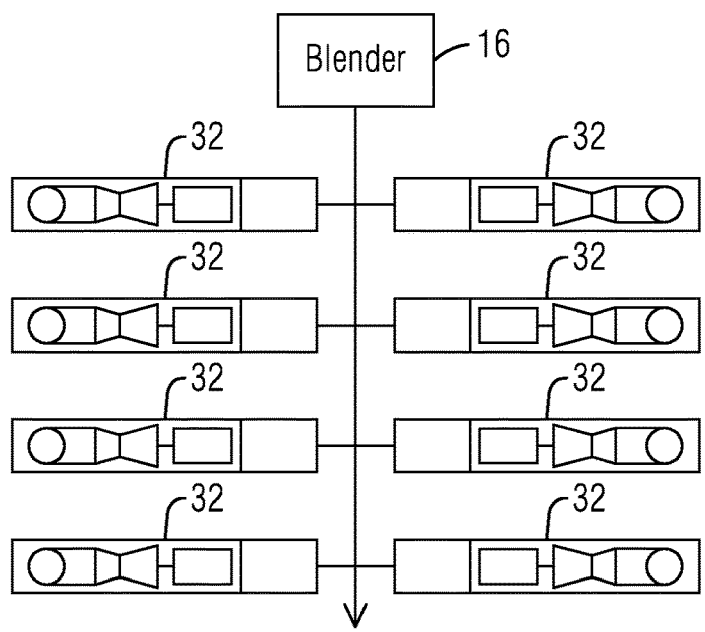
FIG. 5 illustrates an exemplary hydraulic fracturing pump wellsite configuration using the hydraulic fracturing pump of FIG. 4.

FIG. 5 illustrates an exemplary hydraulic fracturing pump wellsite configuration using the hydraulic fracturing fluid pump of FIG. 4. The configuration illustrated in FIG. 5 shows two quadrants of a hydraulic fracturing configuration as they would be positioned on a wellsite. The configuration uses only four trailers to supply all of the pumping equipment for a quadrant of the configuration, as each hydraulic pump and the associated gas turbine used to drive it are mounted on a single semi-trailer 32. As such, only four semi-trailers are needed to supply all of the mechanical equipment used to drive for hydraulic fracturing pumps. This configuration saves the footprint of two semi-trailers over the previously discussed hydraulically driven pump configuration shown in FIG. 3 and saves over 10 semi-trailers over conventional diesel powered systems.

Figure 6:
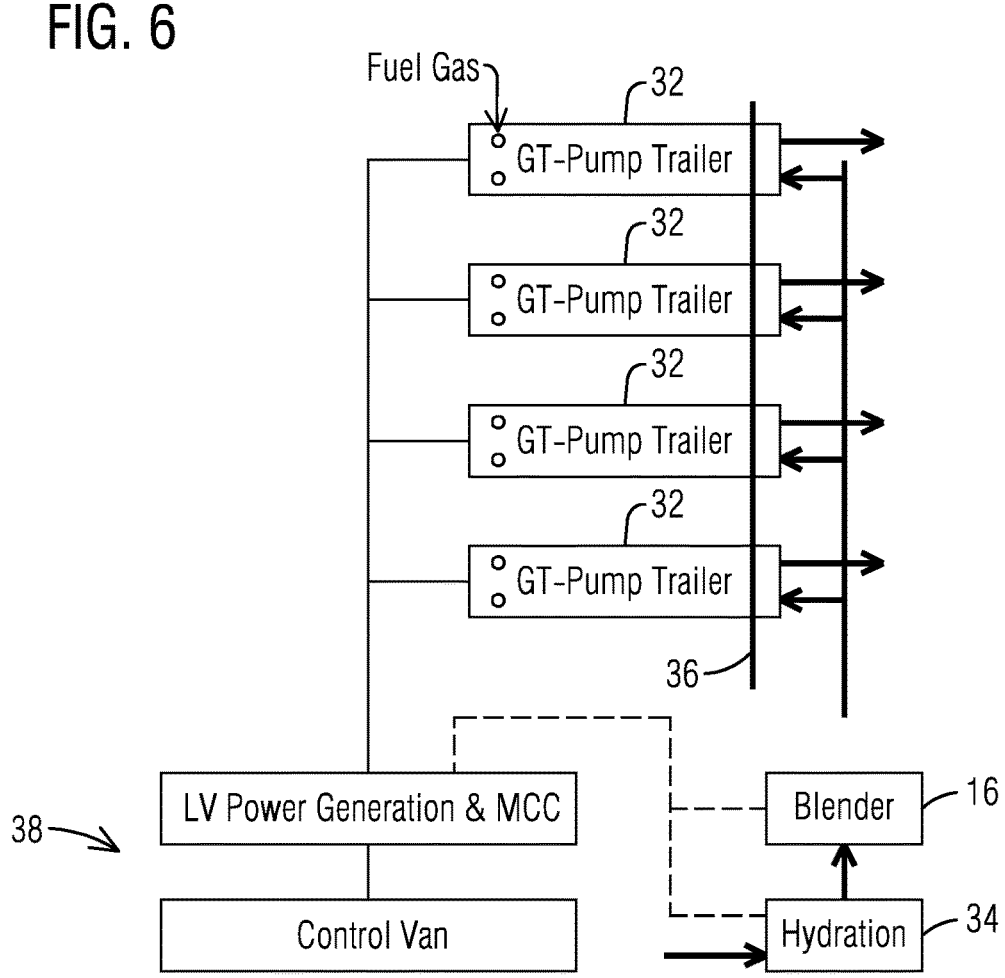
FIG. 6 illustrates an exemplary 4 pump quadrant of equipment for a hydraulic fracturing fluid pump based configuration.

FIG. 6 illustrates an exemplary quadrant of equipment (a 4 pump quadrant) for a hydraulic fracturing fluid pump based configuration. In showing the quadrant, the inventors note that a typical configuration uses a single blender 16 and hydration unit 34 for an entire wellsite. The configuration shown illustrates a blender 16 positioned in the quadrant for illustration purposes only, as it is understood that a single blender would typically supply 4 quadrants of pumping equipment. The configuration in FIG. 6 is similar to the configuration illustrated in FIG. 5, however, additional components used in the system and or the particular quadrant are shown. For example, a common fuel piping 36 (the vertical line crossing each of the pump trailers near the right edge of the pump trailers) may be used to supply fuel to each of the gas generators on the hydraulic fracturing pump trailers. Further, each of the hydraulic fracturing pump trailers 32 may be in electrical communication with a control system 38 that is configured to control the operation of each of the hydraulic fracturing pump trailers, along with the various other components of a hydraulic fracturing operation. The control system 38 is generally contained in a separate control van or trailer on the wellsite. Similarly, a hydration unit 34 and a blending unit 16 may be in fluid communication with the hydraulic fracturing fluid pump on each of the hydraulic fracturing fluid pump systems in my trailers. The hydration unit 34 and the blending unit 16 may be used to add various chemicals and proppants to the fracturing fluid that is provided to the input of the hydraulic fracturing fluid pump to be pressurized before it is injected into the wellbore.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A hydraulic fracturing system, comprising:
    a fixed speed gas turbine mounted to a semi-trailer;
    a hydraulic pump mounted to the semi-trailer and directly connected to an output shaft of the gas turbine; and
    a hydraulically driven fracturing fluid pump mounted to the semi-trailer and being in fluid communication with the hydraulic pump, the hydraulic pump supplying fluid pressure to the hydraulically driven fracturing fluid pump,
    wherein the fluid pressure supplied by the hydraulic pump is arranged to control a flowrate of the hydraulically driven fracturing pump,
    wherein the hydraulically driven fracturing fluid pump receives fracturing fluid containing chemicals and proppants and pressurizes the fracturing fluid to a pressure sufficient for injection into a wellbore for a hydraulic fracturing operation.

2. The hydraulic fracturing system of claim 1, further comprising a quadrant of four semi-trailers each having a fixed speed gas turbine assembly, a hydraulic pump, and a hydraulically driven fracturing fluid pump mounted thereon, each of the four semi-trailers being in fluid communication with a wellbore to supply high pressure fracturing fluid thereto.

3. The hydraulic fracturing system of claim 2, wherein each of the four semi-trailers is in fluid communication with a hydration unit and a blending unit that supplies the fracturing fluid.

4. The hydraulic fracturing system of claim 3, wherein the four semi-trailers form a fracturing system quadrant that may be repeated in a configuration to generate a four quadrant configuration for a wellsite that included up to sixteen semi-trailers with gas turbine driven hydraulic pumps on each semi-trailers.

5. A hydraulic fracturing system, comprising:
 a fixed speed gas turbine mounted to a semi-trailer;
 a hydraulic pump mounted to the semi-trailer and connected to receive mechanical power from the gas turbine; and
 a hydraulically driven fracturing fluid pump mounted to the semi-trailer and being in fluid communication with the hydraulic pump, the hydraulic pump supplying fluid pressure to the hydraulically driven fracturing fluid pump,
 wherein the fluid pressure supplied by the hydraulic pump is arranged to control a flowrate of the hydraulically driven fracturing pump,
 wherein the hydraulically driven fracturing fluid pump receives fracturing fluid containing chemicals and proppants and pressurizes the fracturing fluid to a pressure sufficient for injection into a wellbore for a hydraulic fracturing operation.

6. The hydraulic fracturing system of claim 5, wherein the hydraulic pump is directly connected to an output shaft of the gas turbine.

7. The hydraulic fracturing system of claim 5, wherein the hydraulic pump is connected to an output shaft of the gas turbine by way of a gearbox.

\* \* \* \* \*